(12) United States Patent
Shilling et al.

(10) Patent No.: US 10,085,324 B2
(45) Date of Patent: Sep. 25, 2018

(54) LONG-RANGE ULTRASONIC OCCUPANCY SENSOR WITH REMOTE TRANSMITTER

(71) Applicant: General Electric Company, Schenectady, NY (US)

(72) Inventors: David Christopher Shilling, East Cleveland, OH (US); Deeder Mohammed Aurongzeb, Round Rock, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 13/664,723

(22) Filed: Oct. 31, 2012

(65) Prior Publication Data

US 2014/0119160 A1    May 1, 2014

(51) Int. Cl.
| | | |
|---|---|---|
| *G08B 13/00* | (2006.01) | |
| *H05B 37/02* | (2006.01) | |
| *G01S 15/04* | (2006.01) | |
| *G01S 7/521* | (2006.01) | |
| *G01S 7/523* | (2006.01) | |
| *G01S 15/00* | (2006.01) | |

(52) U.S. Cl.
CPC .......... *H05B 37/0227* (2013.01); *G01S 7/521* (2013.01); *G01S 7/523* (2013.01); *G01S 15/003* (2013.01); *G01S 15/04* (2013.01)

(58) Field of Classification Search
CPC ........ G08B 13/00; H01H 47/20; H01H 35/00; H04W 4/04; H05B 37/0227
USPC .............. 340/540, 539.14, 539.3, 541, 545.3
See application file for complete search history.

(56) References Cited

U.S. PATENT DOCUMENTS

| | | | | |
|---|---|---|---|---|
| 4,150,415 | A * | 4/1979 | Fichtner | 361/182 |
| 5,786,644 | A * | 7/1998 | Zaretsky | 307/117 |
| 5,909,365 | A * | 6/1999 | Merwin et al. | 363/89 |
| 5,986,357 | A | 11/1999 | Myron | |
| 6,912,429 | B1 | 6/2005 | Bilger | |
| 8,018,166 | B2 | 9/2011 | Soccoli et al. | |
| 2008/0122295 | A1 | 5/2008 | Yu et al. | |
| 2010/0052894 | A1 | 3/2010 | Steiner et al. | |
| 2010/0277306 | A1 | 11/2010 | Leinen et al. | |
| 2012/0139426 | A1 | 6/2012 | Ilyes et al. | |
| 2012/0248990 | A1 * | 10/2012 | Goyal et al. | 315/152 |
| 2014/0065975 | A1 * | 3/2014 | Schmidt | H04W 16/14 455/67.11 |

FOREIGN PATENT DOCUMENTS

| | | |
|---|---|---|
| CN | 101316780 A | 12/2008 |
| GB | 2425902 A | 11/2006 |
| WO | 2010116283 A2 | 10/2010 |

OTHER PUBLICATIONS

PCT Search Report and Written Opinion dated Feb. 4, 2014 from corresponding Patent Application No. PCT/US2013/061405.

(Continued)

*Primary Examiner* — Brent Swarthout
(74) *Attorney, Agent, or Firm* — Peter T. DiMauro

(57) ABSTRACT

An occupancy sensor device for monitoring a space includes a transmitter portion and a receiver portion. The receiver portion is located remotely from the transmitter portion. To enable reliable detection of occupancy within the monitored space, an estimate of the signal transmitted by the active sensor in the transmitter portion is compared to the signal received by the transmitted portion.

7 Claims, 4 Drawing Sheets

(56) References Cited

OTHER PUBLICATIONS

Unofficial English translation of Chinese Office Action issued in connection with corresponding CN Application No. 201380068982.1 dated May 23, 2016.
European Office Action issued in connection with corresponding EP Application No. 13771349.1 dated Mar. 8, 2017.

* cited by examiner

LONG-RANGE ULTRASONIC OCCUPANCY SENSOR WITH REMOTE TRANSMITTER

BACKGROUND

The aspects of the present disclosure relate generally to the field of occupancy sensors, and in particular to long range occupancy sensors.

Due to a desire to save energy as well as new building codes, automatic lighting control devices are increasing in popularity. One common type of automatic lighting control is the single-room occupancy or vacancy sensor. These devices use one or more sensing means to determine whether a room is occupied or vacant and control the lighting for the room accordingly. Occupancy sensors can be positioned in a room in several ways. One of the most common arrangements is to replace a standard wall switch in a wall box with an occupancy sensor. This arrangement, generally referred to as a wallbox sensor, gives the occupancy sensor access to the lighting circuit both for switching and for powering its internal circuitry. Due to historical wiring techniques, however, a neutral AC connection is rarely available in this arrangement. These devices draw operational current by utilizing ground leakage currents. Therefore, the ground connection must be utilized for current return. This wiring environment is often referred to as a two-wire connection. When a neutral AC connection is available along with the AC hot and ground connection, it will be referred to as a three-wire connection. The terms "hot", "neutral" and "ground" connections are generally intended to encompass their ordinary and understood meanings where "hot" is any conductor connected within an electrical system that has electrical potential relative to electrical ground or neutral; "neutral" is the return leg of an electrical power circuit; and "ground" is a conductor with continuity to earth ground potential. An electrical outlet is a point in the wiring system where current is delivered to equipment utilizing electrical power.

The sensing technologies can be broadly classified as passive technologies, which only receive energy from the room, or active technologies, which transmit energy into the room. An active sensor, such as an ultrasonic or microwave sensor, uses a transmitter to emit energy into a space to be monitored. The greater the energy transmitted, the larger the space that can be monitored. The sensor then uses a receiver to collect the reflected energy and analyze it for signs of occupancy within the space. The receiver portion is low-power since no energy must be emitted. Active sensors or devices have the transmitter and receiver co-located in the same device.

As noted above, it is common for occupancy sensors to be installed as replacements for standard wall switches, giving the sensor access to the AC lighting circuit for switching and powering of its internal circuitry. However, since AC neutral wiring is not provided in these arrangements, the power used by the sensor must be limited, and the ground connection is utilized for current return. However, the amount of ground return leakage current is typically limited by safety standards, to 500 microamperes for example. Active sensing technologies struggle to adhere to this limitation and the power availability can be inadequate to monitor a large space. If an alternative to ground leakage current, such as battery power or photovoltaic power, is used to power the device, power availability is similarly limited.

Because these technologies exhibit good performance when detecting minor motion, they have become an increasingly larger part of modern sensors. The more power that is available to active sensors, the better their operational sensing range. Therefore, occupancy sensors subject to the power restrictions listed above will be subject to range and performance limitations if they employ active sensing. It would be advantageous to provide an active sensor arrangement which avoids the power limitations of no-neutral installations for greater sensing range.

Ultrasonic sensors operate by detecting a Doppler frequency shift between the transmitted and received signals. Doppler frequency shifts are generated by the ultrasonic energy that is reflected off of a moving object in the space. The magnitude of the frequency shift is proportional to speed of the moving object. In one embodiment, Doppler shifts greater than approximately 40 Hz are interpreted as motion with in the space. Thus, the receiver unit must have access to the original transmitted waveform in order to reliably determine the occupancy status of a room. Active sensors will have the transmitter and the receiver co-located in the same package to enable such access to the transmitted waveform. However, such co-location will limit the power that is available to the transmitter from the leakage ground current. It would be advantageous to be able to enable the receiver to accurately detect occupancy in the space without direct access to the original transmitted waveform.

Accordingly, it would be desirable to provide an occupancy sensor that addresses at least some of the problems identified above.

SUMMARY

As described herein, the exemplary embodiments overcome one or more of the above or other disadvantages known in the art.

One aspect of the present disclosure relates to an occupancy sensor for monitoring a space. In one embodiment, the occupancy sensor includes a transmitter portion and a receiver portion. The receiver portion is located remotely from the transmitter portion.

Another aspect of the present disclosure relates to a method for detecting occupancy of a monitored space using an occupancy sensor that includes a transmitter remotely located from the receiver. In one embodiment, the method includes generating a transmitting a signal from the transmitter, generating an estimate of the transmitted signal in the receiver, detecting a reflected version of the transmitted signal in the receiver, comparing the estimate of transmitted signal to the detected reflected version of the transmitted signal, and determining an occupancy condition of the monitored spaced based on the comparison.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE DISCLOSED EMBODIMENTS

Figure 1:
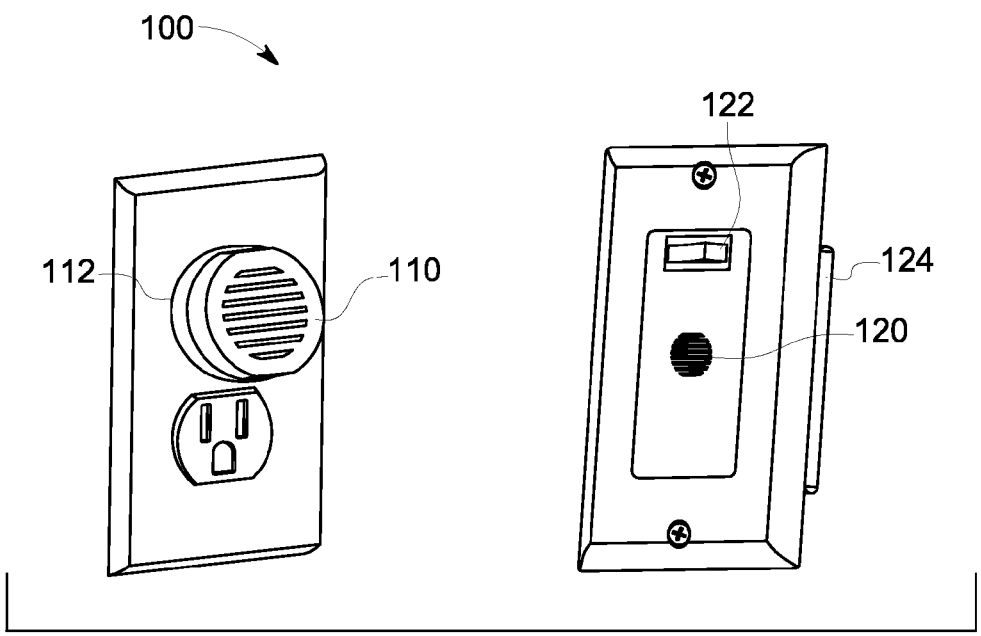
FIG. 1 illustrates a block diagram of an occupancy sensor system incorporating aspects of the disclosed embodiments.

Referring to FIG. 1, one embodiment of an occupancy sensor system incorporating aspects of the disclosed embodiments is generally illustrated as reference 100. The aspects of the disclosed embodiments are generally directed to an occupancy sensor that incorporates active sensing technology where the high power transmitter portion is physically separated and remotely located from the low power receiver portion. This separation allows the transmitter portion to be located where ample power is available.

As shown in FIG. 1, the occupancy sensor system 100 utilizes active sensing technologies, referred to herein as an active sensing device, and generally includes a transmitter portion 110 and a receiver portion 120. In the embodiment illustrated in FIG. 1, the sensor system 100 utilizes ultrasonic energy at approximately 40 kHz as the active sensing medium. Alternative embodiments may utilize any suitable active sensing medium, including alternative frequencies of ultrasonic energy, such as 25 kHz or 32 kHz, or any suitable RF frequency of electromagnetic energy, such as microwave energy. In certain embodiments, the sensor system 100 may utilize a combination of active or passive sensing means to achieve better sensitivity and performance, as is known in the art.

Referring to the exemplary embodiment shown in FIG. 1, the transmitter portion 110 and the receiver portion 120 are not co-located. In a typical active occupancy sensor, the transmitter and receiver are located together within the same package. The aspects of the disclosed embodiments physically separate the transmitter portion 110 and the receiver portion 120, as is described herein.

The transmitter portion 110 will be electrically coupled to source of electrical power, generally described herein as AC power, which is sufficient to provide adequate electrical power to the active sensing device. In one embodiment, a suitable source of electrical power is any standard wall outlet providing AC power through hot and neutral AC connections. For the purposes of the description herein, this connection will be referred to herein as a "standard AC connection" drawing power from the AC circuit and utilizing the AC neutral return. In certain embodiments, this outlet may provide 120 VAC, 240 VAC, 277 VAC or other acceptable AC voltages. In alternate embodiments, the source of electrical power can be any suitable electrical power source, such as a low-voltage or DC power supply.

In the embodiment shown in FIG. 1, the transmitter portion 110 is shown electrically coupled, or for example, plugged into an electrical outlet 112. In this embodiment, the transmitter portion 110 is removably coupled to the electrical outlet 112, which comprises a standard AC electrical outlet that includes a hot and neutral power line connection. In alternate embodiments, the transmitter portion 110 can be electrically coupled to a wall or ceiling mounted electrical fixture, where for example, three-wire electrical power may be provided to the fixture.

The receiver portion 120 is shown in FIG. 1 as being co-located with the switch 122 for the AC lighting circuit in a wallbox 124. Power is supplied to the receiver portion 120 from power source 304. In the embodiments described herein, the power source 304 for the receiver portion 120 is not the same as the power source 208 for the transmitter portion. As noted above, the transmitter portion 110 generally draws power from the hot and neutral AC wire connections. The receiver portion 120 generally requires low power and can operate satisfactorily off of the ground leakage power or current supplied from the AC hot lead. In one embodiment, the source 304 of electrical power for the receiver portion is a two-wire connection in an AC wallbox 124. As the term is used herein, a "two-wire connection" generally refers to electrical power supply where no neutral is present. The two wires are the AC hot and earth ground connections. In alternate embodiments, the source 304 of electrical power for the receiver portion 120 can include any power source that draws the needed power without using a neutral wire, and can include other forms of energy harvesting such as battery power and photovoltaic power sources.

Figure 2:
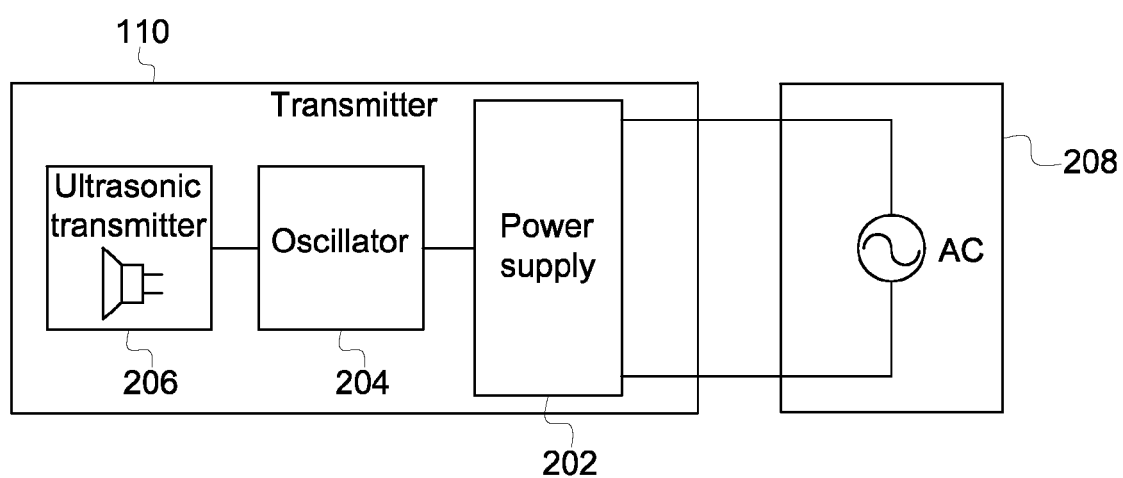
FIG. 2 illustrates schematic block diagram of an exemplary transmitter portion of an occupancy sensor system incorporating aspects of the present disclosure.

FIG. 2 illustrates a schematic block diagram of one embodiment of a transmitter portion 110 for the occupancy sensor system 100. In this embodiment, the transmitter portion 110 includes a power supply 202, an oscillator circuit or device 204 coupled to the power supply and an ultrasonic transmitter 206 coupled to the oscillator circuit 204. In one embodiment, the oscillator circuit 204 is configured to generate an approximately 40 kHz signal. The power supply 202 of the transmitter portion 112 is coupled to a suitable source 208 of electrical power, such as the AC outlet 112 illustrated in FIG. 1.

Figure 3:
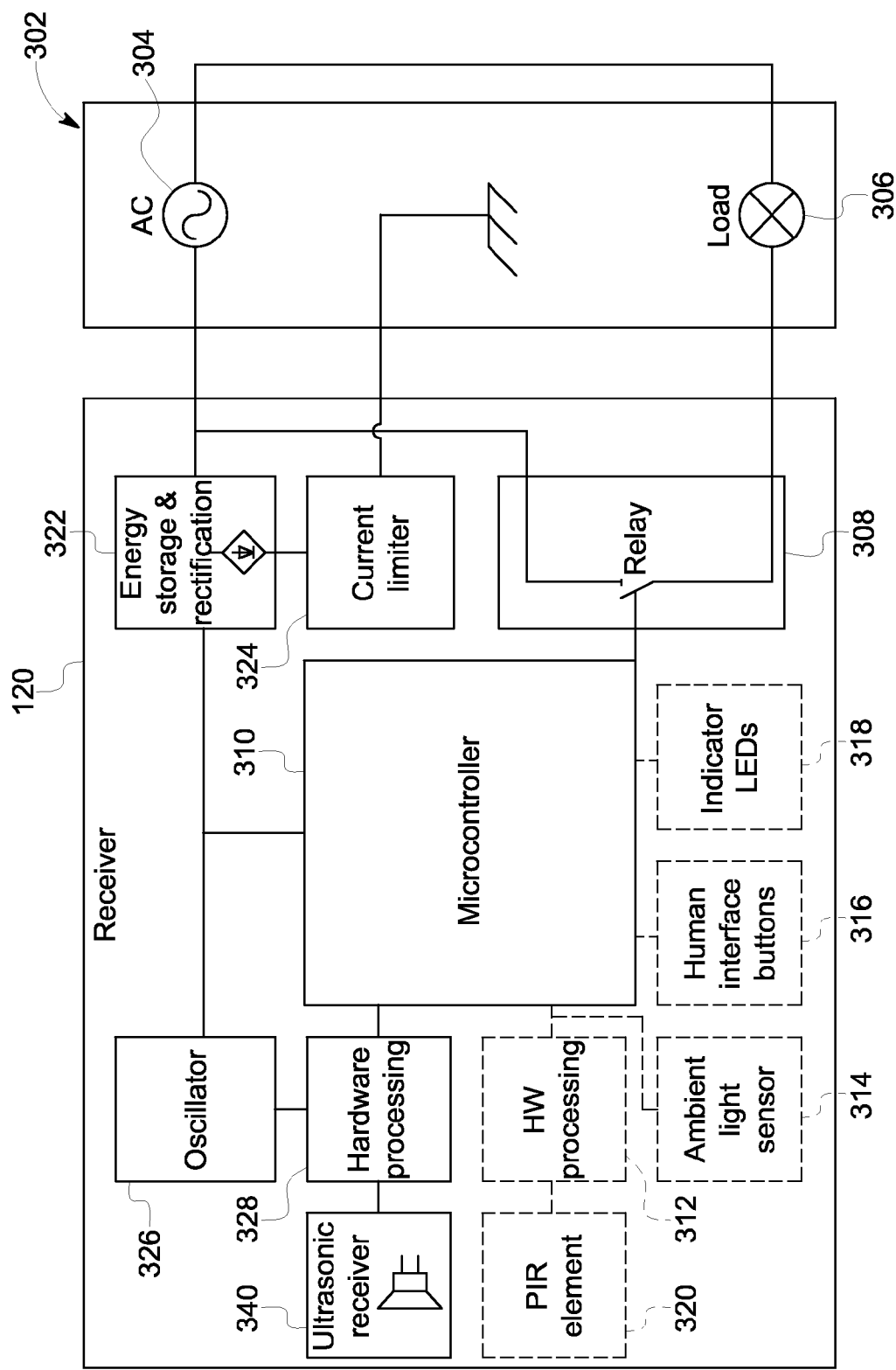
FIG. 3 illustrates a schematic block diagram of an exemplary receiver portion of an occupancy sensor system incorporating aspects of the present disclosure.

FIG. 3 illustrates one embodiment of the receiver portion 120 shown in FIG. 1. In this embodiment, the receiver portion 120 is co-located in a wall box 124, as shown in FIG. 1, and is electrically connected to the AC lighting circuit, generally represented by 302, in the wall box 124. The lighting circuit 302 generally includes a source 304 of electrical power which is coupled to a load 306, such a light or other electrically operated or activated device. As noted above, the source 304 generally comprises the ground leakage current from the hot wire connection of an AC circuit, and will include connections to the hot and ground lines. A switching device 308, such as for example a relay, is used to switch or enable electrical power to be delivered to the load 306, such as for example a light or alarm.

The receiver portion 120 shown in FIG. 3 includes a microcontroller 310, such as a processor, that is used to control the operation and functionality of the receiver portion 120. In one embodiment, the microcontroller 310 is comprised of machine-readable instructions that are executable by a processing device. The microcontroller 310 can be communicatively coupled to one or more of a hardware processing module 312, infrared or ambient light sensor 314, interface buttons or controls 316 and indicator LEDs 318. The ambient light sensor 314 can be used to gather room condition information, while the user can provide information to the system 100 through the user controls 316. The hardware processing module 312 is connected to a passive infrared element 320. The receiver portion 120 can also include additional passive infrared ("PIR") sensing components, such as PIR element 320, to create a dual or multiple technology sensor. While these components are described herein as being part of the receiver portion 120, in one embodiment, these components can be included as part of the transmitter portion 110. In this embodiment, the transmitter portion 110 can communicate the additional information and condition data to the receiver portion 120 wirelessly by encoding it onto the active sensing medium. In an ultrasonic system, the transmitter portion 110 can convey digital information through coded ultrasonic bursts. For example, in one embodiment, a user at the location of the transmitter portion 110 may desire to convey information comprising device settings to the receiver portion 120. In this embodiment, the user can input the setting data, through for example a user interface coupled to the transmitter portion 110, and the transmitter portion 110 will encode the additional data onto the signal transmitted by the transmitted portion. In this way, the additional information can be wirelessly transmitted from the transmitter portion 110 to the receiver portion 120, using for example, ultrasonic bursts.

In the embodiment shown in FIG. 3, the receiver portion 120 also includes an energy storage and rectification module 322 for rectifying the electrical power from the AC power source 304 and providing electrical power to the microcontroller 310 and other electrically powered components in the receiver portion 120. A current limiter 324 can be included to limit the current delivered to the receiver portion 120.

The receiver portion 120 can also include an oscillator circuit or device 326. As will be described further below, the oscillator circuit 326 can be used to generate an estimate of the transmitted signal generated by the oscillator circuit 204 in the transmitter portion 110. In one embodiment, the oscillator circuit 326 is configured to generate an approximately 40 kHz signal The receiver portion 120 can also include a hardware processing circuit 328 and an ultrasonic receiver 340. The hardware processing circuit 328 is generally configured to compare the signal detected by the ultrasonic receiver 340 to the frequency of the signal generated by the oscillator circuit 326.

In the embodiments described herein, the transmitter portion 110 and the receiver portion 120 are physically separated from one another, and are not co-located, as is the case in the typical wallbox occupancy sensor arrangement. This advantageous arrangement allows the transmitter portion 110, which is generally a high power active sensor transmitter, to be connected to any suitable source of electrical power, while the low power receiver portion can be electrically coupled to the two-wire (hot and ground) lighting circuit in the wallbox 124. By providing a greater power source to the transmitter portion 110, the transmitter portion 110 will be able to transmit a higher energy signal, and the occupancy sensor system 100 can cover a wider area. The receiver portion 120 then uses the sensor 340 to collect the reflected energy and analyze it for signs of occupancy within the monitored space. While the aspects of the disclosed embodiments will generally be described herein with respect to a monitored space such as a room, the aspects of the disclosed embodiments can be used to monitor any suitable area.

As noted above, Doppler shifts greater than approximately 40 Hz are interpreted as motion with in the space. In the embodiments disclosed herein, the estimate of the signal transmitted by the transmitter portion 110 must generally be accurate to within approximately less than 40 Hz to avoid false readings. In alternative embodiments, the frequency shift threshold can be set to any suitable level that corresponds with usage patterns of the space being monitored. The aspects of the disclosed embodiments physically separate the transmitter portion 110 and receiver portion 120 from one another. Thus, in order to reliably detect occupancy, in one embodiment, the receiver portion 120 generates an estimate of the signal transmitted by the transmitter portion 110 and compares it to the signal received by the receiver portion 120. In one embodiment, the frequency estimate is generated by including the oscillator circuit 326 in the receiver portion 120, where the oscillator circuit 326 is substantially identical to the oscillator circuit 204*s* included in the transmitter portion 110. In alternative embodiments, one or more of the hardware processing circuit 328 and microcontroller 310 can include the necessary circuitry to provide an estimate of the signal transmitted by the transmitter portion 110.

The oscillator circuits 204 and 326 in the transmitter and receiver portions 110, 120, respectively, are configured to operate at substantially the same frequency. By using similarly designed and configured oscillator circuits in each of the transmitter and receiver portions 110, 120, the estimate of the transmitted signal can generally be accurate to within the part-to-part variation of the components used in the system 100. For example, testing demonstrates that using a 100-ppm crystal oscillator with 5-ppm temperature gradient, 5-ppm yearly degradation and 5-ppm shift due to mechanical shock, the worst case error at 40 kHz is approximately 10.8 Hz.

Figure 4:
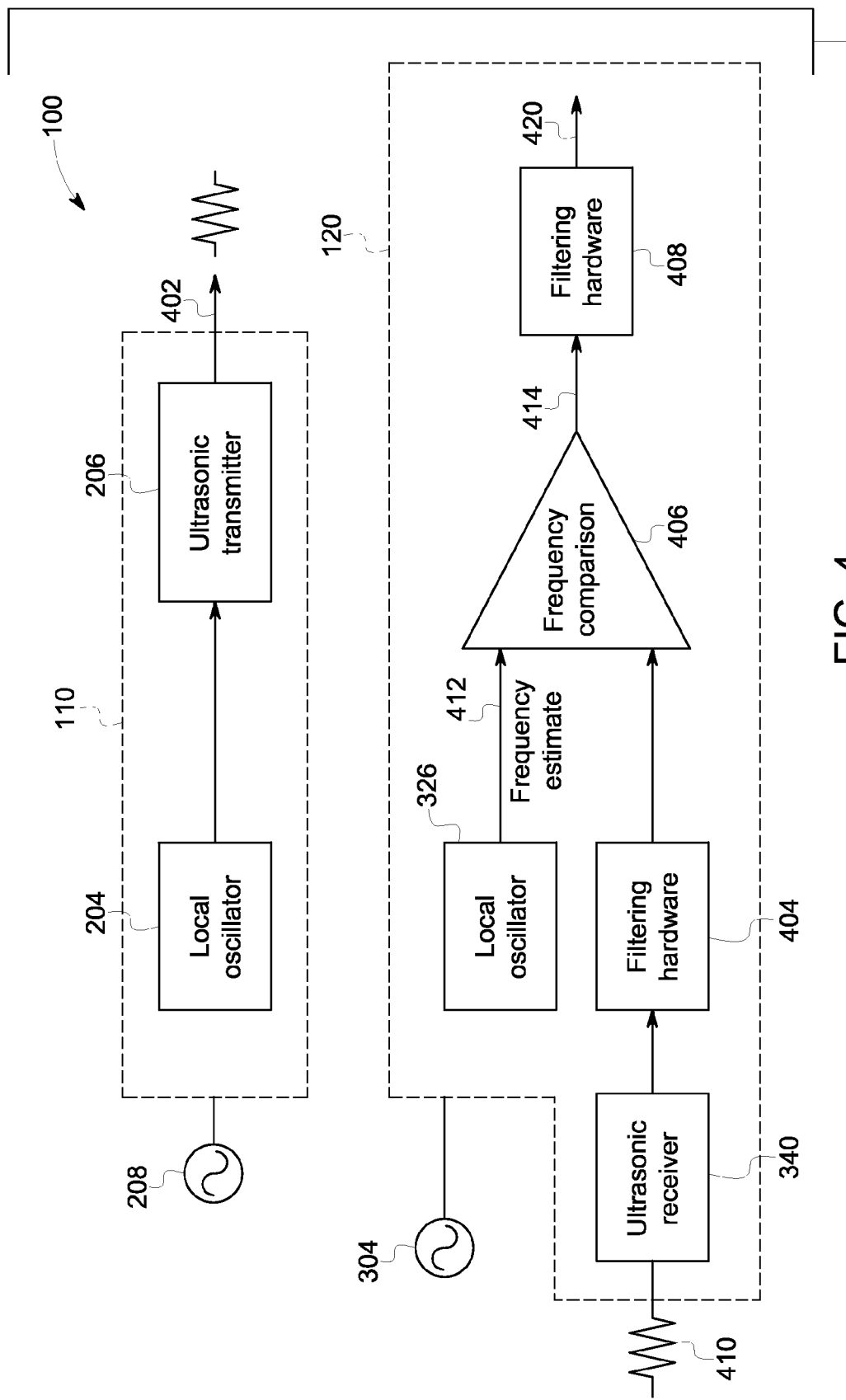
FIG. 4 illustrates a schematic block diagram of an exemplary signal estimation and receiving circuit for an occupancy sensor incorporating aspects of the disclosed embodiments.

FIG. 4 illustrates a schematic block diagram of one embodiment of the system 100 incorporating aspects of the present disclosure. The system 100 includes a transmitter portion 110 and a receiver portion 120. The transmitter portion 110 and the receiver portion 120 are not co-located together. In one embodiment, the transmitter portion 110 and the receiver portion 120 are physically separated. Each of the transmitter portion 110 and receiver portion 120 receive electrical power from different power sources. In one embodiment, the electrical power source 208 for the transmitter portion 110 is a hot and neutral AC wire connection. The electrical power source 304 for the receiver portion 120 is a hot and ground AC wire connection.

The transmitter portion 110 includes a local oscillator 204 and an ultrasonic transmitter 206. In the exemplary embodiments, the frequency of the local oscillator 204 in this example is approximately 40 kHz. The transmitter portion 110 is configured to generally a sensing signal 402, as is generally understood.

In the embodiment shown in FIG. 4, the receiver portion 120 generally includes an ultrasonic receiver 340, filtering hardware 404, frequency comparison device 406 and filtering hardware 408. The receiver portion 120 also includes local oscillator device 326. As described above, the local oscillator device 326 is configured to generate a local oscillator signal that is substantially the same as the local oscillator signal generated by the oscillator 204.

The receiver 120 is configured to receive a reflected version 410 of the transmitted signal 402. The reflected version 410 of the transmitted signal 402 may or may not be the same as the transmitted signal 402, depending upon the occupancy of the room. The reflected version 410 is detected by the ultrasonic receiver 340, filtered in filtering hardware 404 and then compared to the frequency estimate signal 412 generated by the local oscillator 326 in the frequency comparison device 406. The frequency estimate signal 412 is substantially identical to the frequency generated by local oscillator 204, within approximately 40 Hz. In this example, the frequency of each of the oscillator 204 and oscillator 326 is approximately 40 kHz. Thus, the signal 414 generated by the frequency comparison device 406 will be indicative of the detection of motion in the monitored space. The detection signal 420 comprises the signal 414 as suitably filtered by the filtering hardware, where needed.

Figure 5:
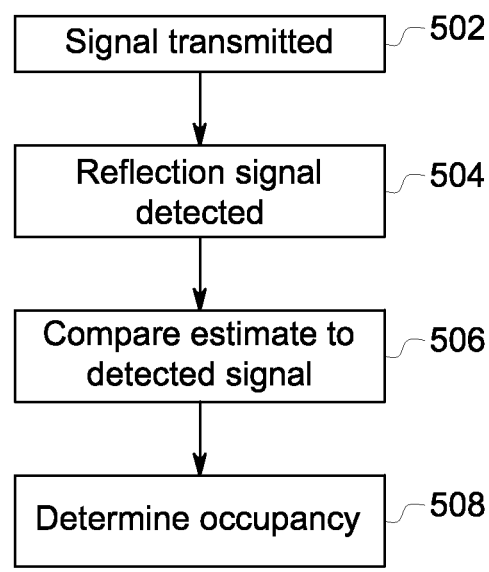
FIG. 5 illustrates one embodiment of a method incorporating aspects of the present disclosure.

FIG. 5 illustrates one embodiment of a method incorporating aspects of the present disclosure. In one embodiment, a signal is transmitted 502 by a transmitter portion 110 of a occupancy detector system 100. A reflection of the transmitted signal is detected 504 by the receiver portion 120. An estimate of the transmitted signal is compared 506 to the reflection of the transmitted signal. After suitable filtering, if desired, the result of the comparison 506 is indicative or is used to determine 508 of the occupancy of the monitored area.

The aspects of the disclosed embodiments overcome the limitations of a no-neutral wire installation of an occupancy sensor using active sensing technologies, typically ultrasonic technologies. By physically separating the transmitter portion and the receiver portion, and locating the transmitter portion where a standard AC power connection (hot and neutral) is available, and not limited to ground leakage current, the transmitter can transmit greater energy. The greater the energy transmitted, the larger the area that can be monitored. The receiver portion then uses a sensor to collect the reflected energy and analyze it for signs of occupancy within the space. The receiver portion can be coupled to a source of electrical power utilizing the hot and earth ground connections, without a neutral connection. In order to reliably detect occupancy, an estimate of the transmitted signal is compared to the received signal, which is a reflection of the transmitted signal. In a preferred embodiment, the estimate must be accurate to within approximately 40 Hz to avoid false readings. Thus, a local oscillator in the transmitter portion is configured substantially identically to a local oscillator in the receiver portion. The local oscillator in the receiver portion generates the estimate of the transmitted signal. The aspects of the disclosed embodiments advantageously overcome the power restrictions of no-neutral installations and provides greater sensing range.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of detecting occupancy of a monitored space using an occupancy sensor comprising a transmitter remotely located from the receiver, the method comprising,
   transmitting a signal from the transmitter;
   generating an estimate of the transmitted signal in the receiver;
   detecting a reflected version of the transmitted signal in the receiver;
   comparing the estimate of transmitted signal to the detected reflected version of the transmitted signal; and
   determining an occupancy condition of the monitored spaced based on the comparison;
   the method further comprising generating a local oscillator signal in the transmitter having a first frequency; and
   generating a local oscillator signal in the receiver having a second frequency, wherein the first frequency and the second frequency are substantially the same and wherein the estimate of the transmitted signal comprises the second frequency.

2. The method of claim 1, wherein the transmitter portion is electrically coupled to hot and neutral electrical connections of an electrical power source and the receiver portion is electrically coupled to hot and ground electrical connections of an electrical power source.

3. The method of claim 1, comprising encoding the transmitted signal with additional information corresponding to device settings.

4. A method of detecting occupancy of a monitored space using an occupancy sensor comprising a transmitter remotely located from the receiver, the method comprising,
   transmitting a signal from the transmitter;
   generating an estimate of the transmitted signal in the receiver;
   detecting a reflected version of the transmitted signal in the receiver;
   comparing the estimate of transmitted signal to the detected reflected version of the transmitted signal; and
   determining an occupancy condition of the monitored spaced based on the comparison;
   the method further comprising generating a local oscillator signal in the transmitter having a first frequency; and
   generating a signal in the receiver having a second frequency, wherein the first frequency and the second frequency are substantially the same and wherein the estimate of the transmitted signal comprises the second frequency.

5. The method of claim 4, wherein the transmitter portion is electrically coupled to hot and neutral electrical connections of an electrical power source and the receiver portion is electrically coupled to hot and ground electrical connections of an electrical power source.

6. The method of claim 4, comprising encoding the transmitted signal with additional information corresponding to device settings.

7. A method of monitoring a space using an active sensor system, the active sensor system comprising a transmitter remotely located from a receiver, the method comprising:
   transmitting a signal from the transmitter;
   generating an estimate of the transmitted signal in the receiver;
   detecting a reflected version of the transmitted signal in the receiver;
   comparing the estimate of transmitted signal to the detected reflected version of the transmitted signal; and
   determining a condition of the monitored spaced based on the comparison;
   the method further comprising generating a local oscillator signal in the transmitter having a first frequency; and generating a local oscillator signal in the receiver having a second frequency, wherein the first frequency and the second frequency are substantially the same and wherein the estimate of the transmitted signal comprises the second frequency.

* * * * *